No. 773,433. PATENTED OCT. 25, 1904.
L. A. STEPHENS.
COTTON WEEVIL DESTROYER.
APPLICATION FILED JUNE 20, 1904.
NO MODEL.

Witnesses
Edwin L. Bradford
G. M. Copenhaver

Inventor
Lee Albert Stephens
By Johnson & Johnson
Attorneys

No. 773,433.       Patented October 25, 1904.

UNITED STATES PATENT OFFICE.

LEE ALBERT STEPHENS, OF NEAR WATT, TEXAS.

COTTON-WEEVIL DESTROYER.

SPECIFICATION forming part of Letters Patent No. 773,433, dated October 25, 1904.

Application filed June 20, 1904. Serial No. 213,438. (No model.)

*To all whom it may concern:*

Be it known that I, LEE ALBERT STEPHENS, a citizen of the United States, residing at Watt, in the county of Limestone and State of Texas, have invented certain new and useful Improvements in Cotton-Weevil Destroyers; and I do hereby declare the following to be a full, clear, and exact description of the invention, such as will enable others skilled in the art to which it appertains to make and use the same.

The weevil commences its ravages upon the cotton-plants by depositing its eggs in the cotton squares or bolls. The squares and young bolls drop from the cotton and collect in the lowest part of the surface between the rows of the plants, and from these bolls full-grown weevils in great abundance will be produced in about seventeen days and attack and destroy the cotton.

To prevent the hatching of the weevil, my invention is directed to the production of means for destroying their eggs and the weevil by crushing them where they lie upon the ground. For this purpose I have produced sheet-iron crushers, preferably connected together in pairs and drawn straddling the row of plants, each crusher of convex form, shaped like a shovel and weighted by carrying the driver, whose seat is mounted directly upon the crusher, so that they will crush the surface of the ground and cause the crusher to seat itself slightly in the surface. Each crusher is drawn between the rows and will crush and destroy the eggs and weevils to such an extent as to reduce the quantity of the weevils hatched to a comparatively small number. The crushers are attached to any suitable wheeled frame drawn by a pair of horses, and the swingletrees will act very effectively to shake off the squares which may have the eggs from the plants in advance of the crushers, so that the loss of the cotton will be comparatively little from the eggs not crushed. Each crusher is connected to a separate drag-pole, which are connected by a yoke which crosses above the row of the plants and carries the driver's seat over the row, and upon this yoke connection each crusher is free to rock transversely in its concave bed.

Figure 1:
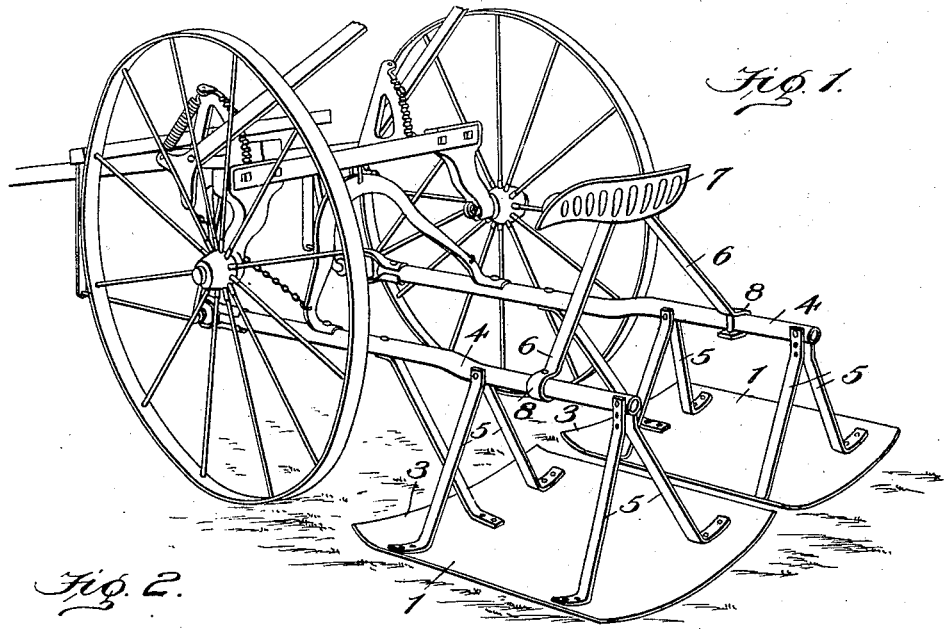
Figure 2:
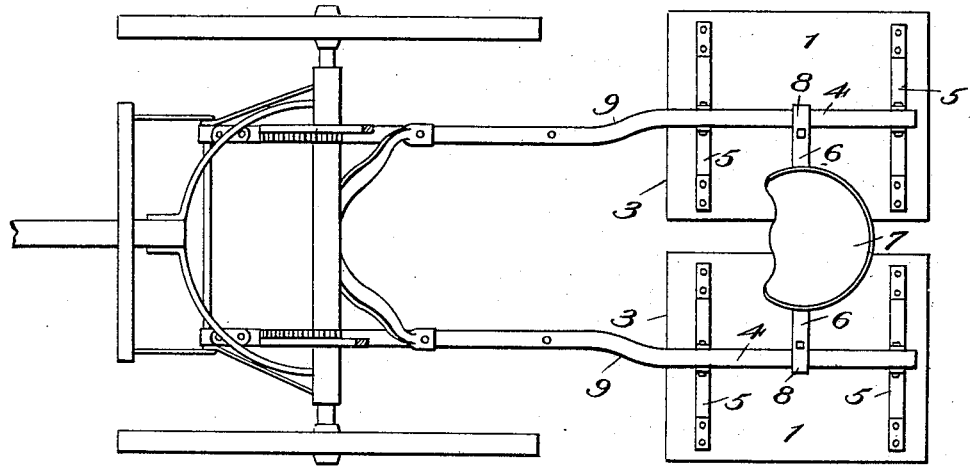
Figure 3:
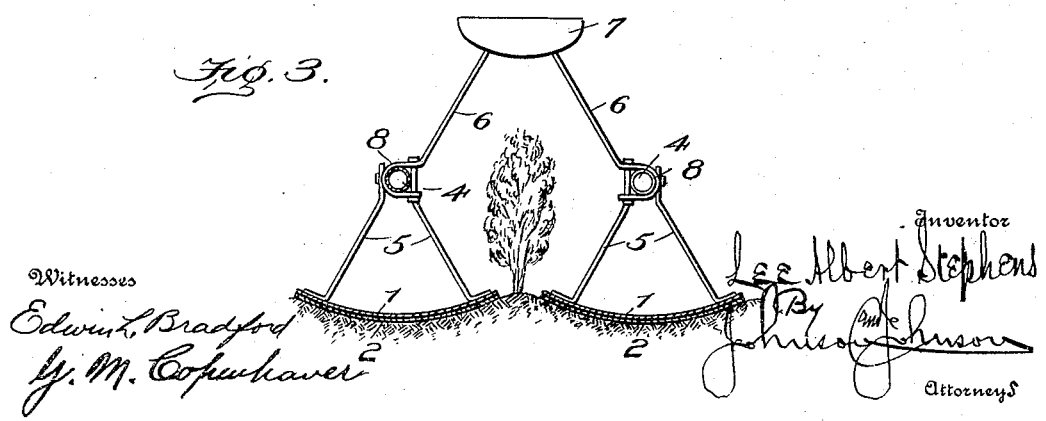

Referring to the accompanying drawings, Figure 1 shows in perspective a pair of sheet-iron shovel-shaped crushers, each secured to and depending from the end of a pole, a driver's seat connecting the poles, and the latter connected to a wheeled frame. Fig. 2 is a top view of the same. Fig. 3 is a transverse section of the pair of crushers connected by the driver's-seat support.

The crushers 1 are preferably of sheet-iron, shaped like a shovel, having a convex bottom and provided with a bottom facing of steel, 2, which may be replaced when worn, of a width so that its edges run about three inches of the row of plants and weighing about one hundred and sixty pounds. At its front edge 3 it is slightly turned to prevent catching in the ground. Mediately of its width a pole 4 is secured by angle-irons or legs 5 5 to its upper side and projects forward, and mounted upon each pole about mediately of the length of the crusher is a yoke 6, which crosses over the row of plants and carries the driver's seat 7 above it. The connection 8 of the yoke with each pole is such as to give a rigid movement to the pole as the crusher is being drawn, and for this purpose its convex form and weight causes it to sink in and give a corresponding shape to the surface to crush and kill the weevil and its eggs and to allow the crushers and their connected poles to rise and fall independently of each other to conform to the surface between each row of plants. The poles of the crushers may be attached to any of the well-known wheeled cultivators.

While I have shown and described a pair of shovel-crushers, obviously a single crusher may be used and carry the driver and his seat.

As the poles are longitudinally central with the shovels, they are formed each with a bend 9 to allow them to extend and connect with the frame between the wheels, and I prefer to make the poles of piping and to connect them to the crushers, so that the latter will be braced transversely and longitudinally at both ends.

As the killing of the weevil-eggs is by crushing them, the crushers are worked between the rows at intervals, commencing about the time the weevils begin to lay their eggs and repeating the operation several times about every eight or ten days, it being understood that the ravages of the weevil commence about the middle of June or the first of July.

It is important to note that the seat is rigidly supported mediately of and between the poles and that each crusher is rigidly connected to each pole and with the seat constitute a rigid entity free to rise and fall.

I claim—

1. In a cotton-weevil destroyer, a crusher of sheet-metal, convex in cross-section, a drag-pole, rigid bracket-hangers connected to the crusher, and on which pole the crusher is rigidly supported as it is being drawn forward.

2. In a cotton-weevil destroyer, a pair of sheet-metal convex crushers, a drag-pole for each crusher connected thereto mediately of its width and supported rigidly on such connection, a yoke connected to each pole about mediately of the length of each crusher, and a seat for the driver mounted on the yoke mediately between the crushers.

3. In a cotton-weevil destroyer, a pair of convex crushers, a drag-pole for each crusher, a yoke connected to each pole and a driver's seat mounted upon the yoke mediately between the crushers, the crushers, and the seat being rigidly connected to the poles.

In testimony whereof I have signed my name to this specification in the presence of two subscribing witnesses.

LEE ALBERT STEPHENS

Witnesses:
 GEORGE BALDWIN,
 D. TAYLOR.